F. BOTTRILL.
TRACTION WHEEL.
APPLICATION FILED OCT. 15, 1907.
902,369.
Patented Oct. 27, 1908.
FIG. 1.
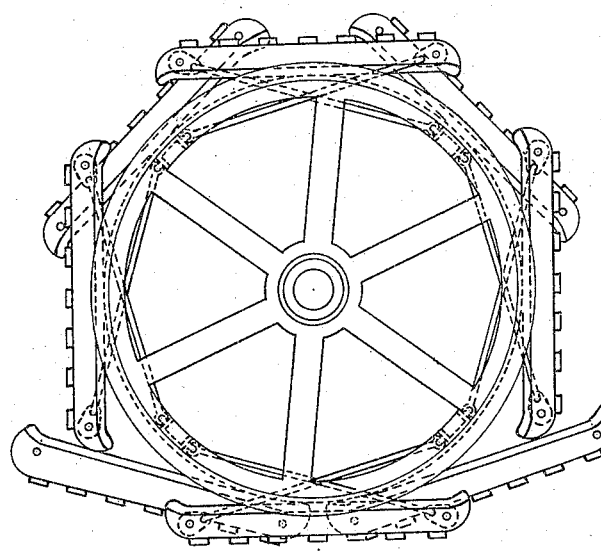
FIG. 2.
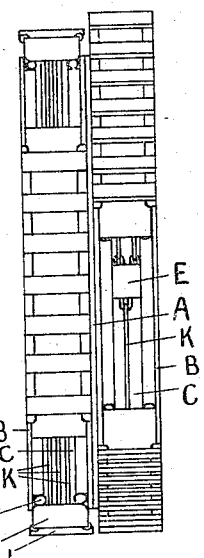
FIG. 3.
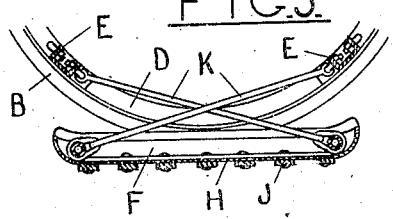
FIG. 6.
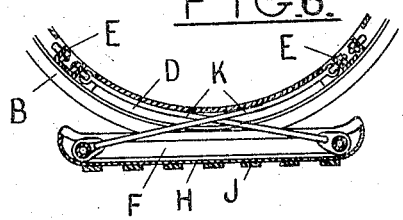
FIG. 4.
FIG. 7.
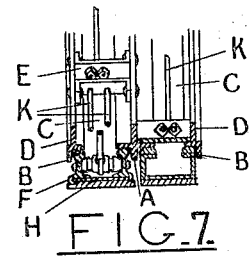
FIG. 5.
WITNESSES:
W. M. Avery
J. P. Davis
INVENTOR
Frank Bottrill
BY
Munn & Co
ATTORNEYS

UNITED STATES PATENT OFFICE.

FRANK BOTTRILL, OF TINTINARA, SOUTH AUSTRALIA, AUSTRALIA.

TRACTION-WHEEL.

No. 902,369.  Specification of Letters Patent.  Patented Oct. 27, 1908.

Application filed October 15, 1907. Serial No. 397,484.

*To all whom it may concern:*

Be it known that I, FRANK BOTTRILL, engineer, a subject of the King of Great Britain and Ireland, residing at Railway Terrace, Tintinara, State of South Australia, Commonwealth of Australia, have invented a certain new and useful Traction-Wheel, of which the following is a specification.

This invention has been devised to facilitate the movement of traction engines and other road vehicles, especially over a sandy or yielding surface, and its novel features consist in the provision of a series of oscillatable bearers flexibly mounted upon and attached to the wheel rim in one or (preferably) two circles, the bearers in each circle being arranged end to end between suitable flanges extending around the rim.

In order that my invention may be clearly understood I will describe the same with reference to the accompanying drawings in which—

Figure 1 is a side view of a wheel provided with two circles or sets of bearers, the connections of the more distant circle being omitted for the sake of clearness. Fig. 2 is a front view of the wheel. Figs. 3 and 4 are sectional views of portion of a wheel showing no spokes and only one of the bearers, Fig. 3 showing more particularly the method of attaching the bearers and Fig. 4 the method of constructing the rim of the wheel. In Fig. 4 two methods of constructing the bearers are shown. Fig. 5 is a plan view of one of the bearers showing portions of the cable connections. Fig. 6 is a similar view to Fig. 3 showing the groove extending part way only through the wheel rim. Fig. 7 shows the method of providing flanges upon an old wheel.

According to my invention the wheel rim is formed with a central flange A and two side flanges B around its circumference. Midway between the central and each of the side flanges is a slot or groove C. Each groove may extend right through the rim, or as shown in Fig. 6 it may be merely an indentation or recess in the rim providing a bed for the cable connection to impinge upon. The rim is attached to the hub by spokes arranged in any suitable manner. The construction I prefer is that shown particularly in Fig. 4 in which the rim is formed of three rings or annular portions D connected together by short channel-shaped pieces E. Where only one set of the bearers is fitted to the rim, the rim has two side flanges only with one groove midway between them.

My invention may be applied to old and existing wheels by securing upon the rim suitable rings of angle iron to form the flanges as shown in Fig. 7.

Each bearer is channel-shaped in cross section. The construction I have devised for heavy wheels, such as those of traction engines, consists preferably of two side beams F connected together by means of a plate H riveted to the outer face of the beams and provided with cross ribs or grippers J. The grippers J are necessary only for driving wheels. The space between the two beams forms a groove along the inner face of each bearer permitting of the attachment and movement of the connections K whereby the bearers are attached to the rim. The inner faces of the bearers oscillate upon the face of the wheel rim between the flanges. Each bearer is flexibly attached to the wheel by cable connections K, preferably three cables crossing one another and lying in the aforesaid grooves of the bearer and of the rim. Each of the connections is approximately the full length of the bearer, one end of each being secured to a cross channel piece of the wheel rim by a U bolt and the other end being secured to the opposite end of the bearer by means of a grooved block encircling a pin in the bearer near its end. The ends of the bearers are slightly curved inwards in order to insure their rapid and exact fitting into place particularly when traveling at fast speeds. For lighter wheels the bearers may be formed of a length of steel plate bent into channel form as shown in Fig. 4. Steel wearing plates are attached to the inner face and metal or wooden grippers to the outer face.

In operation the wheel as it rotates carries the bearers around with it and as each bearer falls upon the earth it forms a substantial flat bed which prevents the wheel from sinking and so enables the engine to exert its full tractive power as if upon a hard road.

Having now fully described and ascertained my said invention and the manner in which it is to be performed I declare that what I claim is—

1. The combination with a wheel having a grooved rim, of a plurality of oscillatable bearers, and cables connecting the bearers to the wheel, the cables of each bearer crossing each other and pivoted to the ends of the bearers, one cable being pivoted at the center of width of the bearer and to the rim at the center of its groove, the other two cables being pivoted adjacent to the sides of the bearer and of the groove.

2. An improved road wheel, comprising a wheel rim formed with a central flange and two side flanges with grooves between the central and each of the side flanges said rim being formed of three annular portions connected together by short channel-shaped pieces, in combination with a series of oscillatable bearers arranged in two circles, the bearers in each circle being arranged end to end and each bearer being flexibly attached to the wheel rim by means of cable connections approximately the full length of the bearer, substantially as described.

3. In an improved road wheel, the combination with a rim having a central flange and two side flanges, of a series of oscillatable bearers mounted end to end between such flanges in two sets or circles and flexibly attached to the rim, substantially as described.

4. A wheel having a rim formed of three rings or annular portions, and spaced pieces connecting the rings, said pieces being substantially U-shaped in cross section and provided at the ends of their side members with flanges, by means of which they are secured to the rings.

5. In an improved road wheel, a rim having a central flange and two side flanges with grooves between, a series of oscillatable bearers arranged end to end between such flanges in two sets or circles and cables attached at the one end to the wheel rim and at the other end to the bearers, substantially as described.

6. In an improved road wheel, a series of oscillatable bearers flexibly mounted upon and attached to the wheel rim, each bearer being channel-shaped in cross section and consisting of two beams connected together by means of a cross piece, each bearer having at each end a cross pin engaged by one end of a connection the other end of such connection being secured to the wheel rim, substantially as described.

In testimony that I claim the foregoing as my invention I have signed my name in the presence of two subscribing witnesses this third day of September 1907.

FRANK BOTTRILL.

Witnesses:
ARTHUR GORE COLLISON,
LESLIE HERBERT BROADBENT.